US008660085B2

(12) United States Patent
Chaponniere et al.

(10) Patent No.: US 8,660,085 B2
(45) Date of Patent: Feb. 25, 2014

(54) METHODS AND APPARATUS FOR TRANSFERRING A MOBILE DEVICE FROM A SOURCE ENB TO A TARGET ENB

(75) Inventors: Etienne F. Chaponniere, Rome (IT); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 871 days.

(21) Appl. No.: 11/949,616

(22) Filed: Dec. 3, 2007

(65) Prior Publication Data

US 2008/0130580 A1 Jun. 5, 2008

Related U.S. Application Data

(60) Provisional application No. 60/868,488, filed on Dec. 4, 2006.

(51) Int. Cl.
*H04Q 7/00* (2006.01)

(52) U.S. Cl.
USPC .......................................... 370/331; 370/328

(58) Field of Classification Search
USPC .................. 370/332, 333, 331, 328, 394; 455/436–439, 442
See application file for complete search history.

(56) References Cited

U.S. PATENT DOCUMENTS

2001/0030965 A1* 10/2001 Tourunen et al. ............ 370/394
2003/0189909 A1 10/2003 Chao et al.
2008/0019320 A1* 1/2008 Phan et al. .................... 370/331
2008/0080516 A1* 4/2008 Sammour et al. ............ 370/394
2008/0095116 A1 4/2008 Kim et al.

FOREIGN PATENT DOCUMENTS

| EP | 1915017 | | 4/2008 |
|---|---|---|---|
| JP | 2113341 | A | 4/1990 |
| JP | 10300759 | A | 11/1998 |
| JP | 2003504968 | A | 2/2003 |
| JP | 2004229269 | A | 8/2004 |
| KR | 20080035313 | A | 4/2008 |
| WO | 05055636 | | 6/2005 |
| WO | 08010063 | | 1/2008 |

OTHER PUBLICATIONS

International Search Report—PCT/US071086387, International Search Authority—European Patent Office—Jun. 3, 2008.
Written.Opinion—PCT/US07/086387, International Search Authority—European Patent Office—Jun. 3, 2008.
"Lower PDCP Layer for Mobility," TSG-Ran Working Group Meeting, XX, XX, vol. TSG-Ran Working Group, No. 2 #53, R2-061344, May 19, 2006, pp. 1-5.
Taiwan Search Report—TW096146135—TIPO—Jul. 31, 2011.

(Continued)

*Primary Examiner* — Thai Nguyen
(74) *Attorney, Agent, or Firm* — Steven Raney

(57) ABSTRACT

A method used in a wireless communication system including a plurality of cells, the method includes transmitting to a mobile device from a source enhanced node B, and sending a Packet Data Convergence Protocol (PDCP) status report to a target enhanced node B. Another method includes transmitting to a mobile device from a source enhanced node B, and sending a Packet Data Convergence Protocol (PDCP) status report to the source enhanced node B prior to a re-pointing to a target enhanced node B.

14 Claims, 12 Drawing Sheets

(56) References Cited

OTHER PUBLICATIONS

Takehiko Yoshino et al., "Digital Sound Transmission System for Television Broadcasting via Satellite," Journal of the Institute of Image Information and Television Engineers, Nov. 20, 1983, vol. 37, No. 11 (423rd volume), pp. 935 941.

ASUSTeK: "Handover when RLC SN reuses PDCP SN", R2-061924, 3GPP TSG-RAN WG2 ON LTE, Jun. 30, 2006.

LG Electronics: "Data handling for handover", R2-061970, TSG-RAN Working Group 2 #53 LTE Adhoc, 3GPP, Jun. 30, 2006.

LG Electronics: "Data handling for handover", R2-062435, TSG-RAN Working Group 2 #54, 3GPP, Sep. 1, 2006.

LG Electronics: "Data handling for handover", R2-062967, TSG-RAN Working Group 2 #55, 3GPP, Oct. 13, 2006.

LG Electronics: "SDU Handling During Inter eNB Handover", 3GPP TSG-RAN WG2 #56, R2-063247, 3GPP, Nov. 10, 2006.

Samsung: "Re-use of PDCP SN at ARQ level?", 3GPP TSG-RAN2 Meeting #53bis, R2-061829, 3GPP, Jun. 30, 2006.

Samsung: "Re-use of PDCP SN at ARQ level?", R2-062825, 3GPP TSG-RAN2 Meeting #55, Oct. 13, 2006.

* cited by examiner (1) PDCP Status Reporting Before Handoff    (2) PDCP Status Reporting After Handoff

METHODS AND APPARATUS FOR TRANSFERRING A MOBILE DEVICE FROM A SOURCE ENB TO A TARGET ENB

CROSS-REFERENCE TO RELATED APPLICATIONS

This application claims the benefit of U.S. Provisional Patent application Ser. No. 60/868,488 entitled "ENHANCED RLC STATUS REPORTING FOR LTE" which was filed Dec. 4, 2006. The entirety of the aforementioned applications is herein incorporated by reference.

BACKGROUND

I. Field

The following description relates generally to wireless communications, and more particularly to providing a mechanism for transferring a mobile device from a source enhanced node B (eNB) to a target eNB.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out (MISO), or a multiple-in-multiple-out (MIMO) system.

Wireless communication systems are widely deployed to provide various types of communication content such as, for example, voice, data, and so on. Typical wireless communication systems may be multiple-access systems capable of supporting communication wife multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division, multiplexing (LFDM), orthogonal frequency division multiple access (OFDMA) systems, and the like.

In a wireless communication system, a Node B (or base station) or enhanced Node B (eNB) may transmit data to a user equipment (UE) on the downlink and/or receive data from the UE on the uplink. The downlink (or forward link) refers to the communication link from the eNB to the UE, and the uplink (or reverse link) refers to the communication link from the UE to the Node B. The eNB may also send control information (e.g., assignments of system resources) to the UE. Similarly, the UE may send control information to the eNB to support data transmission on the downlink and/or for other purposes. As the mobile device is moved it is desirable to switch eNBs. For example, fee mobile device is in communication with a source eNB, and then, the device is approaching another eNB, the target eNB, and it is desirable to handover from the source to the target. This handover is also termed herein a re-pointing.

In 3GPP LTE (Long Term Evolution) which is the name given to a project within the Third Generation Partnership Project to improve the Universal Mobile Telecommunication System (UMTS) mobile phone standard to cope with future requirements. In LTE, it is currently agreed that during eNB re-pointing the radio link-control (RLC) Protocol Data Units (PDU)s will not be forwarded from the source eNB to the target eNB. Additionally the RLC can be reset at each eNB re-pointing event. By reset, it is meant that any RLC Service Data Units (SDU)s that were not completely delivered by RLC at the source eNB will need to be retransmitted at the target eNB.

Since RLC operation is not continuous at eNB re-pointing, special care need be taken to avoid wasting too much radio capacity and creating potential user plane interruption during the re-pointing or transferring procedure,

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one exemplary non-limiting embodiment, a method used in a wireless communication system including a plurality of cells, the method includes transmitting to a mobile device-front a source enhanced node B, and sending a Packet Data Convergence Protocol (PDCP) status report to a target enhanced, node B from the mobile device. Because the target enhanced node B receives the status report, only the missing RLC SDUs (PDCP packets) need to be sent and this avoids transmitting duplicated RLC SDUs at the target eNB to the mobile device. In another exemplary non-limiting embodiment, a method includes transmitting to a mobile device from a source enhanced node B, and sending a Packet Data Convergence Protocol (PDCP) status report to the source enhanced node B prior to a re-pointing to a target enhanced node B.

The source enhanced node B can use a X2 logical network (that connects the enhanced node Bs together) to inform the target enhanced node B which PDCP packets to send. Accordingly, a mobile device can be handed off from a source enhanced node B to a target enhanced node B with some of the RLC SDUs being sent to the mobile device from the source enhanced node B and some of the RLC SDUs being sent to the mobile device from the target enhanced node B. In one exemplary non-limiting embodiment, the source stops sending any RLC SDUs once the handoff begins. If the source enhanced node B receives the PDCP status report from the mobile device before re-pointing, the source enhanced node B does not need to forward the RLC SDUs that were already received by the mobile devices and this saves bandwidth of the X2 logical layer.

In accordance with an aspect, apparatus includes a mobile device with a processor configured to send a Packet Data Convergence Protocol (PDCP) status report to a target enhanced node B after re-pointing to the target enhanced node B. The processor is also configured to send at least one PDCP sequence number to the target enhanced node B. The processor is further configured to receive the RLC SDUs from a source enhanced node B and ignore the RLC SDUs from the source enhanced node B. The processor can be configured to send a handoff Confirm Message to the target enhanced node B.

To the accomplishment of the foregoing and related ends, the one or more embodiments comprise the features hereinafter fully described and particularly pointed out in the claims. The following description and the annexed drawings set forth, in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
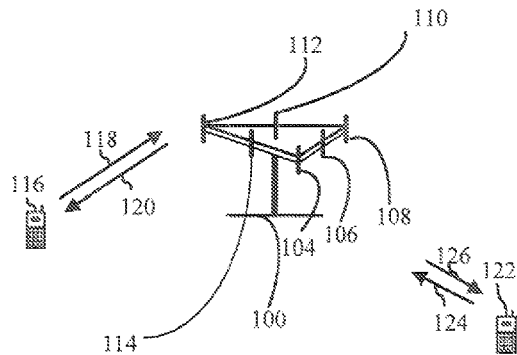
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In accordance with one exemplary non-limiting embodiment, a method used in a wireless communication system including a plurality of cells, the method includes transmitting to a mobile device from a source enhanced node B, and sending a Packet Data Convergence Protocol (PDCP) status report to a target enhanced node B from the mobile device. Because the target enhanced node B receives the status report, only the missing PDCP packets need to be present. In another exemplary non-limiting embodiment, a method includes transmitting to a mobile device from a source enhanced node B, and sending a Packet Data Convergence Protocol (PDCP) status report to the source enhanced node B prior to a re-pointing to a target enhanced node B. The source enhanced node B can use the X2 logical network to inform the target enhanced node B which PDCP packets to send. Accordingly, a mobile device can be handed off from a source enhanced node B to a target enhanced node B with some of the RLC SDUs being sent to the mobile device from the source enhanced node B and some of the RLC SDUs being sent to the mobile device from the target enhanced node B. In one exemplary non-limiting embodiment, the source stops sending any RLC SDUs once the handoff starts. If the source enhanced node B receives the PDCP status report form the mobile device before re-pointing, the source enhanced node B does not need to forward the RLC SDUs that were already received by the mobile devices and this saves bandwidth of the X2 logical layer.

In accordance with an aspect, apparatus includes a mobile device with a processor configured to send a Packet Data Convergence Protocol (PDCP) status report to a target enhanced node B after re-pointing to the target enhanced node B. The processor is also configured to send at least one PDCP sequence number to the target enhanced node B. The processor is further configured to receive the RLC SDUs from a source enhanced node B and ignore the RLC SDUs from the source enhanced node B. The processor can be configured to send a handoff confirm message to the target enhanced node B.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus, may be implemented and/or a method practiced using other structure and/or functionality in addition to or other than one or more of the aspects set forth herein. As an example, many of the methods, devices, systems, and apparatuses described herein, are described in the context of an ad-hoc or unplanned/semi-planned deployed wireless communication environment that provides repeating ACK channel in an orthogonal system. One skilled in the art should, appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data, packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set form in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device or media. For example, computer-readable media may include magnetic storage devices (e.g., hard disk, floppy disk, magnetic strips . . . ), optical disks (e.g., compact disk (CD), digital versatile disk (DVD) . . . ), smart cards, flash memory devices (e.g., card, stick, key drive . . . ), and the like. Additionally, various storage media described herein can represent one or more devices and/or other machine-readable media for storing information. The term "machine-readable medium" can include, without being limited to, wireless channels, and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The eNB transferring techniques from source to target described herein may be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). Cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDMO, etc. These various radio technologies and standards are known in the art.

UTRA, E-UTRA, and GSM are part of Universal Mobile Telecommunication System (UMTS). Long Term Evolution (LTE) is an upcoming release of UMTS that uses E-UTRA, UTRA, E-UTRA, GSM, UMTS, and LTE are described in documents from an organization named "3rd Generation Partnership Project" (3GPP), Cdma2000 is described in documents from an organization named "3rd Generation Partnership Project 16" (3GPP2). For clarity, certain aspects of the techniques are described below for uplink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system, bandwidth into multiple (N) orthogonal sub-carriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods. The LTE downlink transmission scheme is partitioned, by radio frames (e.g. 10 ms radio frame). Each frame comprises a pattern made of frequency (e.g. sub-carrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more sub-carrier and one or more OFDM symbol. One or more resource blocks may be used for transmission of data, control information, pilot or any combination thereof.

A single-frequency network or SFN is a broadcast network where several transmitters simultaneously send the same signal over the same frequency channel. Analog FM and AM radio broadcast networks as well as digital broadcast networks can operate in this manner. Analog television transmission has proven to be more-difficult, since the SFN results in ghosting due to echoes of the same signal.

In wideband digital broadcasting, self-interference cancellation is facilitated by the OFDM or COFDM modulation method. OFDM uses a large number of slow low-bandwidth modulators- instead of one fast wide-band modulator. Each modulator has its own frequency sub-channel and sub-carrier frequency. Since each modulator is very slow, we can afford to insert a guard interval between the symbols, and thus eliminate the ISI. Although the fading is frequency-selective over the whole frequency channel, it can be considered as flat within the narrowband sub-channel. Thus, advanced equalization filters can be avoided. A forward error correction code (FEC) can counteract that a certain portion of the sub-carriers are exposed to too much fading to be correctly demodulated.

OFDM is utilized in the terrestrial digital TV broadcasting systems such as DVB-T and ISDB-T. OFDM is also widely used in digital radio systems, including DAB, HD Radio, and T-DMB. Therefore these systems are well suited to SFN operation. The 8VSB modulation method, used, in North America for digital TV, specified in ATSC standard A/110, may perhaps also allow the use of SFN transmission.

Through the use of virtual channel numbering, a multi-frequency network (MFN) can appear as an SFN to the viewer in ATSC. Alternatives to using OFDM modulation in SFN self-interference cancellation would be: CDMA Rake receivers. MIMO channels (i.e. phased array antenna). Single-carrier modulation in combination by guard intervals and frequency domain equalization. In a Single Frequency Network, the transmitters and receivers are usually synchronized with the others, using GPS or a signal from the main station or network as a reference clock. For example, the use of a special marker can be employed, the Mega-frame Initialization Packet (MIP) that is inserted in the hit stream at a central distribution point, and signals the SFN transmitters the absolute time (as read from a GPS receiver) at which this point in the data stream is to be broadcast.

Referring to FIG. 1, a multiple access wireless communication system according to one embodiment is illustrated. An access point 100 (AF) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. Access terminals 116 and 122 can be UEs. In a FDD system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beam forming in order to improve the signal-to-noise ratio of forward links for the different access terminals 116 and 124. Also, an access point using beam forming to transmit to access terminals scattered randomly through its coverage causes less interference to access terminals in neighboring cells than, an access point transmitting through a single antenna to all its access terminals.

An access point may be a fixed station used for communicating with the terminals and may also be referred to as an access point, a Node B, an enhanced node B (eNB) or some other terminology. An access terminal may also be called an access terminal, user equipment (UE), a wireless communication device, terminal, access terminal, or some other terminology.

Figure 2:
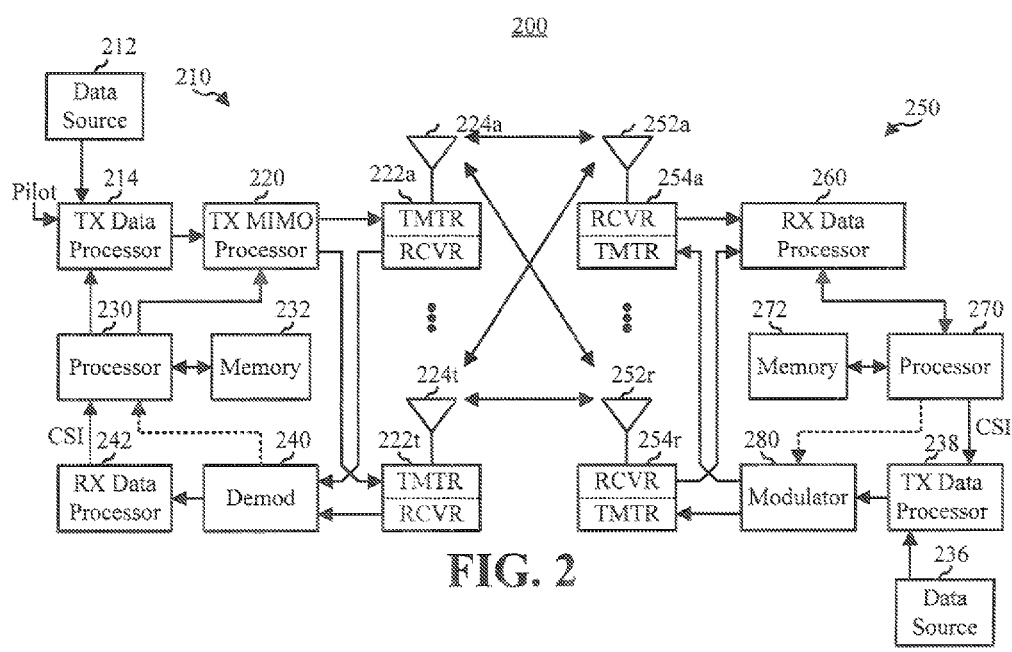
FIG. 2 depicts an example communications apparatus for employment with a wireless communications environment in accordance with one or more aspects.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data, processor 214 formats, codes, and interleaves the traffic data for each data stream based on a particular coding scheme selected for that data stream to provide coded data.

The coded data for each data stream may be multiplexed with pilot data using FORM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BASK, ASK, M-PSF, or M-QAM) selected for that data stream to provide modulation symbols. The data rate, coding, and modulation for each data stream may be determined by instructions performed by processor 230.

The modulation symbols for all data stream's are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and up converts) the analog signals to provide a modulated signal suitable for transmission over the MIMO channel. $N_T$ modulated signals, from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which preceding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data steams from a data source 236, modulated by a modulator 280, conditioned by transmitters 254a through 254r, and transmitted, back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam forming weights then processes the extracted message.

In an aspect, logical, channels are classified into Control Channels and Traffic Channels. Logical Control Channels comprises Broadcast Control Channel (BCCH) thai is DL channel for broadcasting system control information, Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS (Note: old MCCH+MSCH). Dedicated Control Channel (BCCH) is Point-to-point bi-directional channel that transmits dedicated control information and used by UEs having an RRC connection. In an aspect, Logical Traffic Channels comprise a Dedicated Traffic Channel (DTCH) that is Point-to-point bi-directional channel, dedicated to one UE, for the transfer of user information. Also, a Multicast Traffic Channel (MTCR) for Point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCB), the PCH for support of UE power saving (DRX cycle is indicated by the network to the LIE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low signal peak to average (PAR) values, and at any given time, the channel is contiguous or uniformly spaced in frequency that is a desired property of a single carrier waveform.

Figure 3:
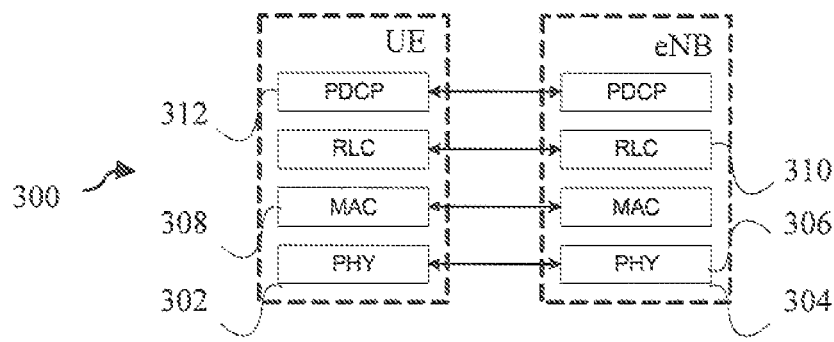
FIG. 3 illustrates an environment with a UE and an eNB in accordance with one or more aspects.
Figure 4:
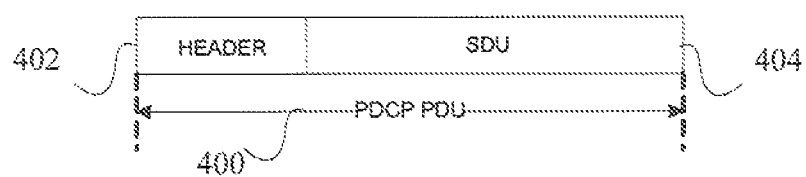
FIG. 4 illustrates that each PDCP Packet Data Unit PDU includes a header and a Service Data Unit (SDU) in accordance with one or more aspects.

FIG. 3 illustrates an environment 300 with a UE 302 and an eNB 304. The UE 302 and the eNB 304 communicate with each other on a plurality of levels or layers. For example, on a physical layer 306, a Medium Access Control (MAC) layer 308, on a Radio Link Control (RLC) layer 310, and at a Packet Data Convergence Protocol (PDCP) layer 312. Each layer is above the layer below it. For example, Radio Link Control (RLC) layer 310 is below Packet Data Convergence Protocol (PDCP) layer 312 and that means the PDCP layer encapsulates the RLC layer. More specifically, the PDCP layer can take a single RLC object and break the object into several packets. As illustrated in FIG. 4, each PDCP Packet Data Unit PDU 400 includes a header 402 and a Service Data Unit (SDU) 404. Typically the PDCP PDU 400 and the PDCP header 402 are octet-aligned, and the PDCP header 402 can be either 1 or 2 bytes long. The main services and functions of the PDCP sub-layer include Header compression and decompression (typically Robust Header Compression only). The PDCP sub-layer handles the transfer of user data. For example, the transmission of user data means that PDCP receives PDCP SDU from the Non-Access Stratum (NAS) and forwards it to the RLC layer and vice versa. In-sequence delivery of upper layer PDUs at hand off (HO) is facilitated by the PDCP sub-layer. The PDCP sub-layer also provides for duplicate detection of lower layer SDUs and the ciphering of user plane data and control plane data.

Figure 5:
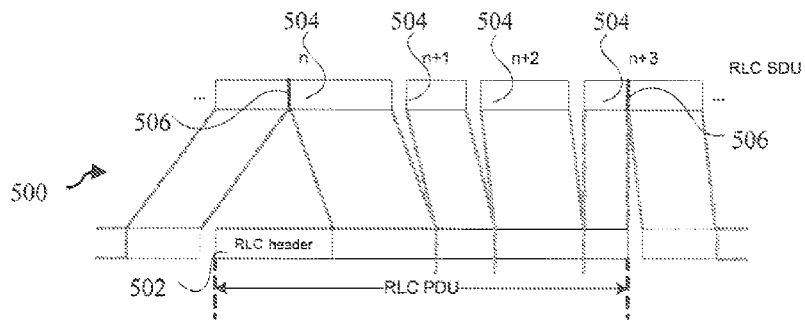
FIG. 5 illustrates a RLC PDU including a RLC header and a plurality of RLC SDUs in accordance with one or more aspects.

FIG. 5 illustrates a RLC PDU 500 including a RLC header 502 and a plurality of RLC SDUs 504. In particular FIG. 5 illustrates the RLC PDU 500 including a RLC header 502 and four RLC SDUs 504. The RLC is also a sub-layer. An overview on services, functions, and PDU structure provided by the RLC sub-layer follows. Note that: the reliability of RLC is configurable: some radio bearers may tolerate rare losses (e.g., TCP traffic); Radio Bearers are not characterized by a fixed sized data unit (e.g., a fixed sized RLC PDU). The main services and functions of the RLC sub-layer include the transfer of upper layer PDUs supporting Acknowledge Mode (AM) or Un-acknowledge Mode (UM), and the Transparent Mode (TM) data transfer. Other services and functions of the RLC sub-layer include Error Correction through Automatic Repeat Request ARQ (CRC check provided by the physical layer, in other words no CRC needed at RLC level) and segmentation according to the size of the Transport Block (TB): only if an RLC SDU does not fit entirely into the TB then the RLC SDU is segmented into variable sized RLC PDUs, which do not include any padding. Other services and functions of the RLC sub-layer include re-segmentation of PDUs that need to be retransmitted, if a retransmitted PDU does not fit entirely into the new TB used for retransmission then the RLC PDU is re-segmented. The number of re-segmentation is not limited. Concatenation of SDUs for the same radio bearer can be done. An in-sequence delivery of upper layer PDUs except at HO in the uplink can be done. A duplicate detection can be done. Protocol error detection and recovery is available. Flow control between an eNB and a UE (such as for example, in a fee for service (FFS) environment) can be provided. The SDU can be discarded and reset.

The RLC PDU structure where the PDU sequence number carried by the RLC header is independent of the SDH sequence number (i.e., PDCP sequence number) is shown in FIG. 5 where a dotted line 506 indicates the occurrence of a segmentation. The segmentation end at a dotted line 508. Because the segmentation only occurs when needed and concatenation is done in sequence, the content of an RLC PDU can generally be described by the following relations:

(0; 1) last segment of $SDU_i$+(0; n) complete SDUs+(0; 1) first segment of $SDU_{i+n+1}$; or 1 segment of $SDU_i$.

Figure 6:
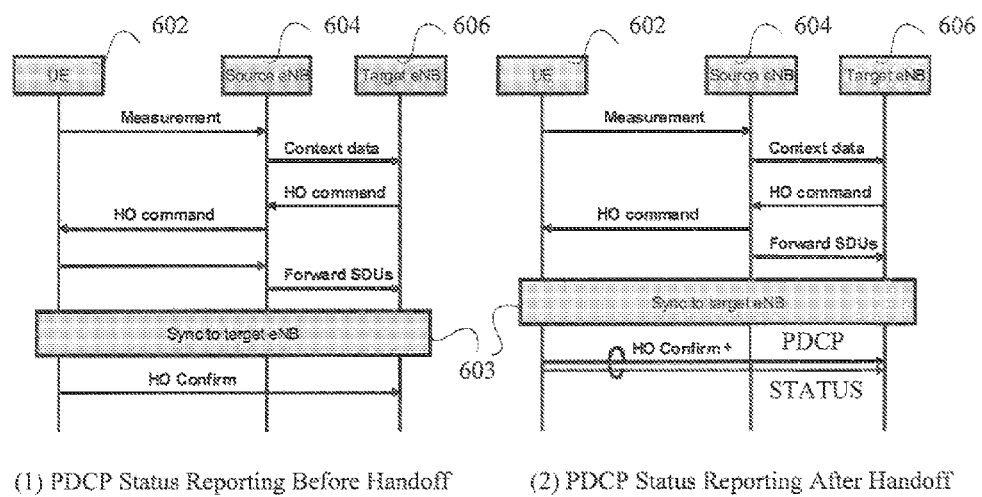
FIG. 6 illustrates an environment including a plurality of UEs synced to a source eNB and a target eNB in accordance with one or more aspects.

Referring now to FIG. 6, an environment 600 includes UEs 602 synced at 603 to a source eNB 604 and a target eNB 606. In (1), the PDCP status report is sent right after the handover command (HO), before the UE has re-pointed to the target eNB. This method is natural to perform in PDCP as the illustrations of FIG. 6 allow all radio hearers to synchronize before the SDUs are forwarded from the source eNB to the target eNB, For this operation, a regular PDCP status report containing RLC SDU information can be used.

One disadvantage of this method is that a UE re-points to a new eNB when the existing radio link with the source eNB is fading away. Under these conditions, it is sensible to trigger the re-pointing procedure as soon as possible and avoid sending important signaling information over a fading link as it will waste radio resources and delay the procedure. One advantage of this method is that since the source eNB receives the status report before, the re-pointing, it can avoid forwarding useless RLC SDUs to the target eNB and thus save X2 bandwidth.

In (2), the PDCP status report is sent to the target eNB after the UE has completed the re-pointing procedure. The RLC PDU information carried in regular RLC status reports from tie UE-source eNB link is not relevant to the UE-target eNB link and thus it cannot be reused directly. Instead the present disclosure proposes the PDCP status report to contain RLC SDU information that is relevant to both the source and target eNBs, An example of such information is the PDCP sequence number that is appended to RLC SDUs by PDCP and constant across eNBs.

One disadvantage of this method is since the source eNB is not aware of the latest status of the UE receiver, it may forward useless RLC SDUs over the X2 interface to the target eNB. These useless SDUs will however not be forwarded over the air because the target eNB will receive the PDCP status report and synchronize its transmitter to the UE receiver.

One advantage of this method is the re-pointing procedure is not delayed by the transmission of the PDCP status report on a fading link. The new status report is instead transmitted to the target eNB that is the new best current radio link.

While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal, processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

It is to be understood that the embodiments herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Figure 7:
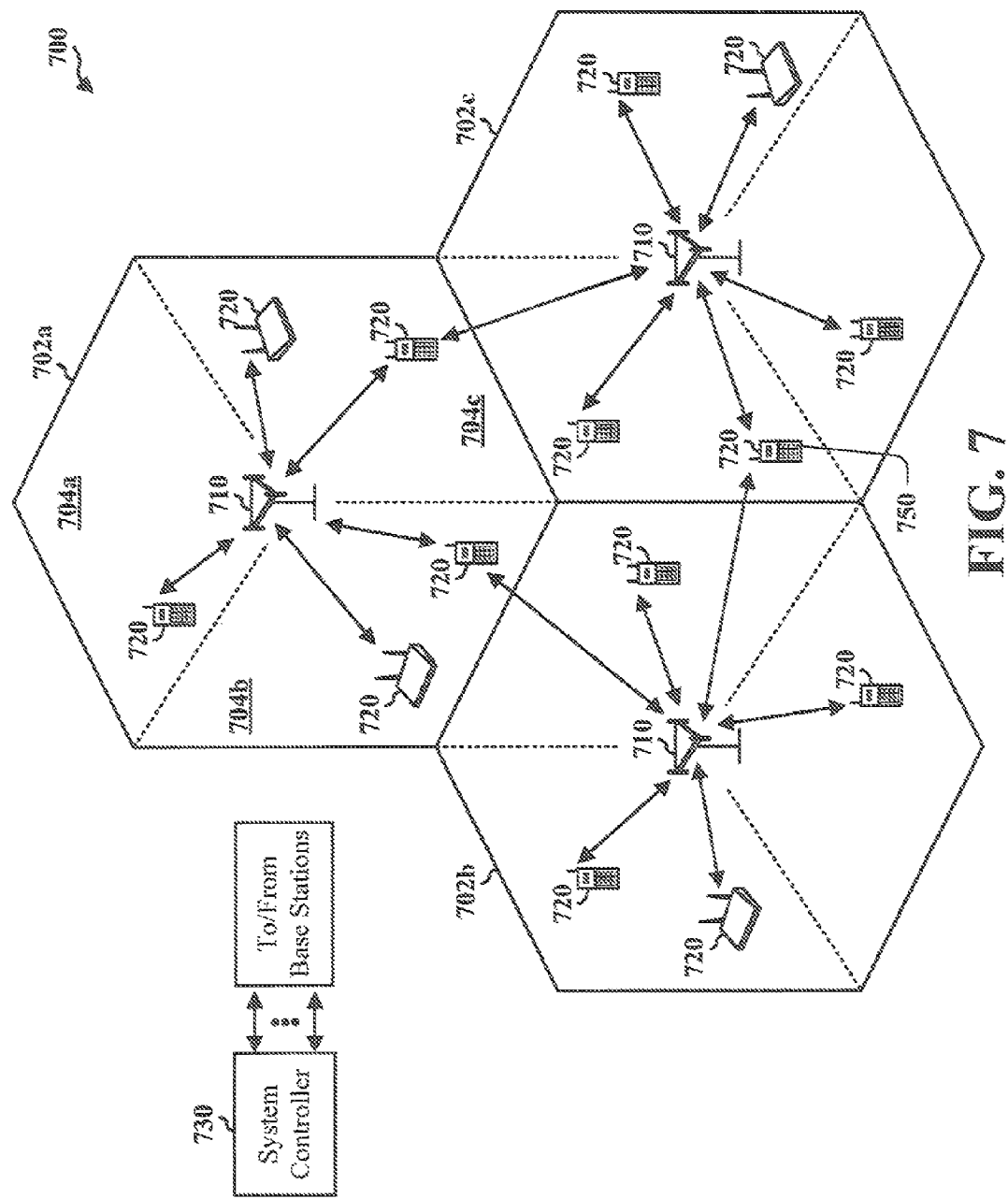
FIG. 7 illustrates a wireless communication system with multiple base stations and multiple terminals, such as may be utilized in conjunction with one or more aspects.

FIG. 7 illustrates a wireless communication system 700 with multiple base stations 710 and multiple terminals 720, such as may be utilized in conjunction with one or more aspects. A base station is generally a fixed station that communicates with the terminals and may also be called an access point, an enhanced Node B, or some other terminology. Each base station 710 provides communication coverage for a particular geographic area, illustrated as three geographic areas, labeled 702a, 702b, and 702c. The term "cell" can refer to a base station and/or its coverage area depending on the context in which the term is used. To improve system capacity, a base station coverage area may be partitioned into multiple smaller areas (e.g., three smaller areas, according to cell 702a in FIG.

7), 704a, 704b, and 704c. Each smaller area can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized ceils as well as a system with, un-sectorized cells. For simplicity, in the following description, the term "base station" is used generically for a fixed station that serves a sector as well as a fixed station that serves a cell.

Terminals 720 are typically dispersed throughout the system, and each terminal may be fixed or mobile. A terminal may also be called a mobile station, user equipment, a user device, or some other terminology. A terminal may be a wireless device, a cellular phone, a personal digital assistant (PDA), a wireless modem card, and so on. Each terminal 720 may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 730 couples to base stations 710 and provides coordination and control for base stations 710. For a distributed architecture, base stations 710 may communicate with one another as needed. Data transmission on the forward link occurs from one access point to one access terminal at or near the maximum data rate that can be supported by the forward link and/or the communication system. Additional channels of the forward, link (e.g., control channel) may be transmitted from multiple access points to one access terminal. Reverse link data communication may occur from one access terminal to one or more access points. One mobile device 750 is leaving 702c and approaching 702b. So 702c eNB is the source eNB and 702b is the target eNB. The PDCP status report is sent to the target eNB after the UE has completed the re-pointing procedure. Or the PDCP status report can be sent to the target eNB before the UE has completed the re-pointing procedure. The RLC PDU information carried in regular status reports from the UE-source eNB link is not relevant to the UE-target eNB link, and thus it cannot be reused directly. Instead the present disclosure proposes the PDCP status report to contain SDU information that is relevant to both the source and target eNBs. An example of such information is the PDCP sequence number that is appended to RLC SDUs by PDCP and constant across eNBs.

Figure 8:
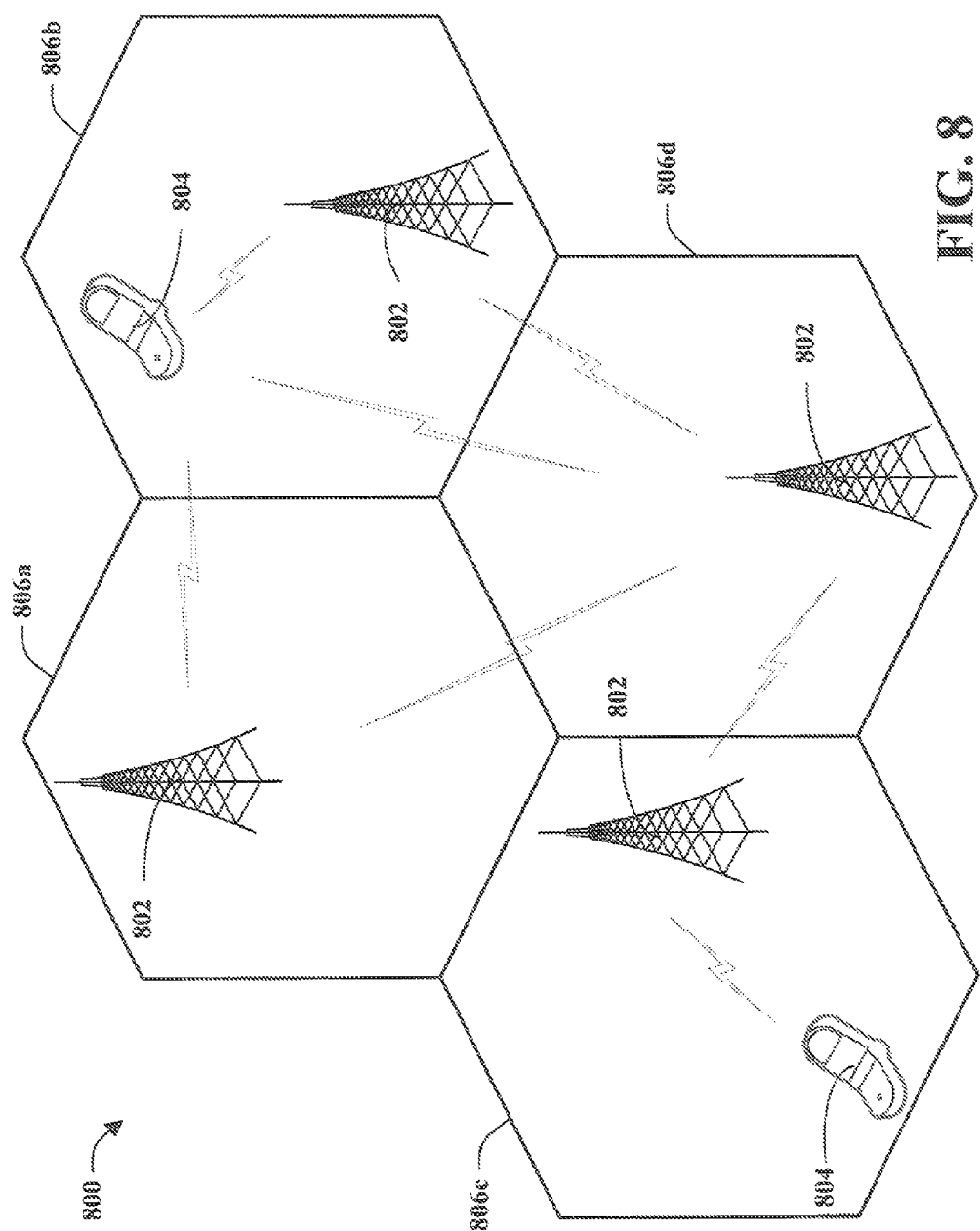
FIG. 8 is an illustration of an ad hoc or unplanned/semi-planned wireless communication environment in accordance with various aspects.

FIG. 8 is an illustration of an ad hoc or unplanned/semi-planned wireless communication environment 800, in accordance with various aspects. System 800 can comprise one or more base stations 802 in one or more sectors that receive, transmit, repeat, etc., wireless communication signals to each other and/or to one or more mobile devices 804. As illustrated, each base station 802 can provide communication coverage for a particular geographic area, illustrated as three geographic areas, labeled 806a, 806b, 806c, and 806d. Each base station 802 can comprise a transmitter chain and a receiver chain, each of which can in turn comprise a plurality of components associated with signal transmission and reception (e.g., processors, modulators, multiplexers, demodulators, demultiplexers, antennas, and so forth.), as will be appreciated by one skilled in the art. Mobile devices 804 may be, for example, cellular phones, smart phones, laptops, handheld communication devices, handheld computing devices, satellite radios, global positioning systems, PDAs, and/or any other suitable device for communicating over wireless network 800. System 800 can be employed in conjunction with various, aspects described herein in order for the PDCP status report to be sent to the target eNB and/or the source eNB before and/or after the UE has completed the re-pointing procedure.

Figure 9:
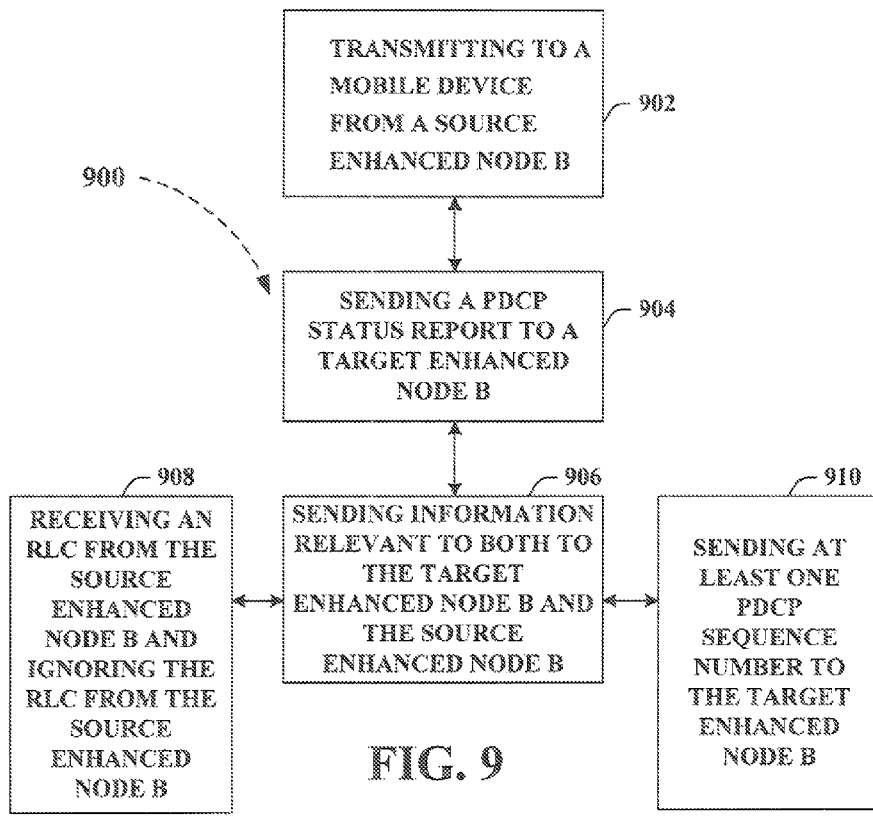
FIG. 9 illustrates a methodology including transmitting to a mobile device from a source enhanced node B in accordance with one or more aspects.

FIG. 9 illustrates a methodology 900 including transmitting to a mobile device from a source enhanced, node B at 902. At 904 is sending a Packet Data Convergence Protocol (PDCP) status report to a target enhanced node B. At 906 is sending information relevant to both to the target enhanced node B and the source enhanced node B. At 908 is receiving an RLC SDUs from the source enhanced node B and ignoring the RLC SDUs from the source enhanced node B. At 910 is sending at least one PDCP sequence number to the target enhanced node B. For example, at least one PDCP sequence number can be sent to the target eNB and/or the source eNB before and/or after the UE has completed the re-pointing procedure.

When the embodiments are implemented in software, firmware, middleware, or microcode, program code or code segments, they may be stored in a computer-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
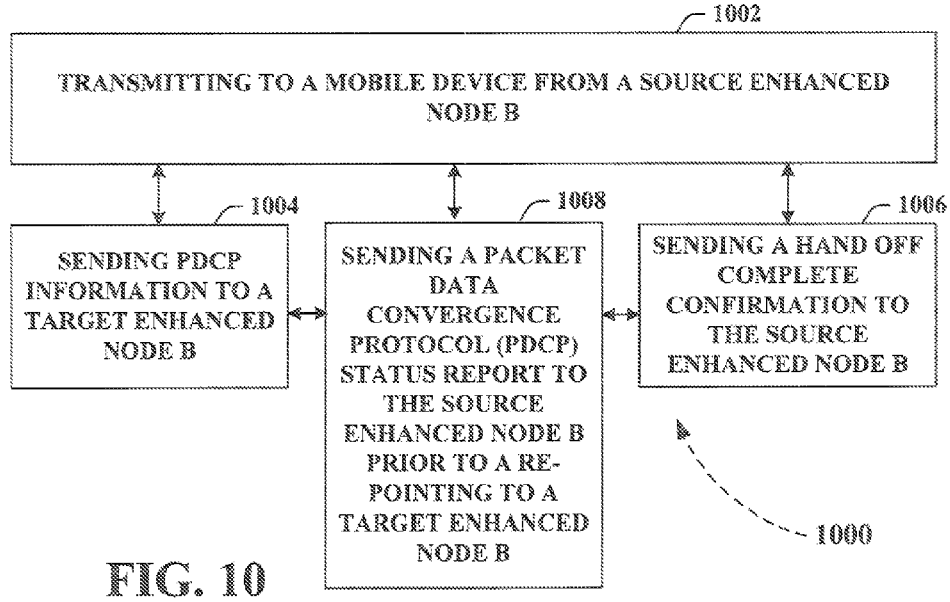
FIG. 10 illustrates a methodology including transmitting to a mobile device from a source enhanced node B in accordance with one or more aspects.

FIG. 10 illustrates a methodology 1000 including transmitting to a mobile device from a source enhanced node B at 1002. In one exemplary generalized non-limiting embodiment, the methodology 1000 includes sending a handoff confirm message to the target enhanced node B at 1006. The methodology 1000 can include sending Packet Data Convergence Protocol (PDCP) information to a target enhanced node B. In another exemplary generalized non-limiting embodiment, the methodology 1000 includes sending a Packet Data Convergence Protocol (PDCP) status report to the source enhanced node B prior to are-pointing to a target enhanced node B is at 1008.

Figure 11:
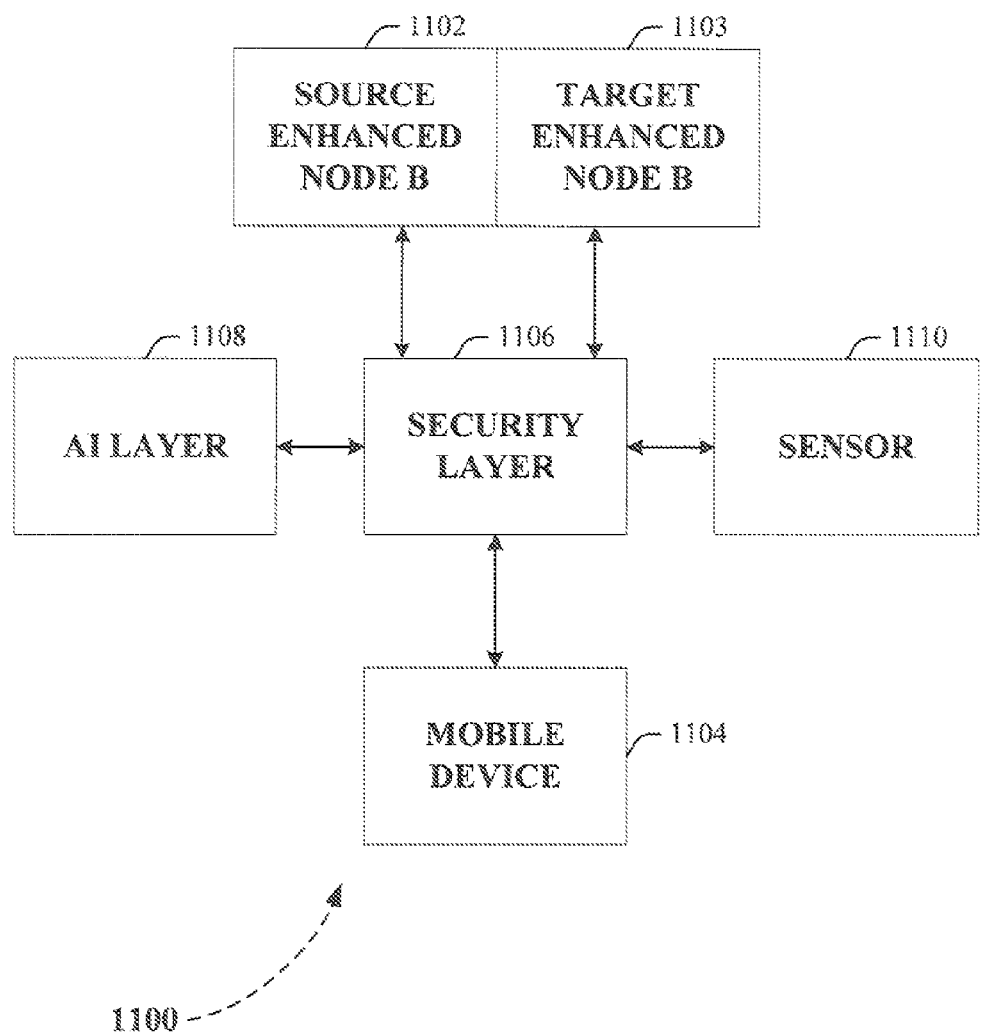
FIG. 11 illustrates a methodology wherein a source enhanced node B and a target enhanced node are in communication with a mobile device in accordance with one or more aspects.

FIG. 11 illustrates a methodology 1100 wherein a source enhanced node B is at 1102 and a target enhanced node B is at 1003. The source enhanced node B can be broadcasting a service such as a CNN feed or a MSNBC feed to a mobile device at 1104. Alternatively of in addition to a broadcast service, the mobile device 1104 can be otherwise connected to the source enhanced node B 1102 such as for making a phone call. The mobile device 1104 is in motion and is approaching an area where the target enhanced node B is closer. In one exemplary generalized non-limiting embodiment, the methodology 1000 includes employing a security layer at 1006. The security layer can determine if the target enhanced node B requires different security than the source eNB, and whether the PDCP information should be sent to the target eNB and/or the source eNB before and/or after the UE has completed the re-pointing procedure, The decision can be made through the employ of an AI layer. In addition, in other embodiments with or without the security layer, cells can dynamically determine if PDCP information should be sent to the target eNB and/or the source eNB before and/or after the UE has completed the re-pointing procedure based at least partially on an AI decision. A sensor can provide feedback at to assist in that decision. For example, the sensor can determine network conditions at a specific time and alter the number and/or locations of mobile devices.

Because at least a portion of the communication between the device 1104 and the SFNs are wireless, the security layer 1106 is provided in one exemplary generalized non-limiting embodiment. The security layer 1106 can be used to cryptographically protect (e.g., encrypt) data as well as to digitally sign data, to enhance security and unwanted, unintentional, or malicious disclosure. In operation, the security component or layer 1106 can communicate data to/from both the enhanced node Bs 1102 and 1103 and the mobile device 1104.

An encryption component can be used to cryptographically protect data during transmission as well as while stored. The encryption component employs an encryption algorithm to encode data for security purposes. The algorithm is essentially a formula that is used to turn data into a secret code. Each algorithm uses a string of bits known as a 'key' to perform the calculations. The larger the key (e.g., the more bits in the key), the greater the number of potential patterns can be created, thus making it harder to break the code and descramble the contents of the data.

Most encryption algorithms use the block cipher method, which code fixed blocks of input that are typically from 64 to 128 bits in length. A decryption component can be used to convert encrypted data back to its original form. In one aspect, a public key can be used to encrypt data upon transmission to a storage device. Upon retrieval, the data can be decrypted using a private key that corresponds to the public key used to encrypt.

A signature component can be used to digitally sign data and documents when transmitting and/or retrieving from the device 1104. It is to be understood that a digital signature or certificate guarantees that a file has not been altered, similar to if It were carried in an electronically sealed envelope. The 'signature' is an encrypted digest (e.g., one-way hash function) used to confirm authenticity of data. Upon accessing the data, the recipient can decrypt the digest and also re-compute the digest from the received file or data. If the digests match, the file is proven to be intact and tamper free. In operation, digital certificates issued by a certification authority are most often used to ensure authenticity of a digital signature.

Still further, the security layer 1106 can employ contextual awareness (e.g., context awareness component) to enhance security. For example, the contextual awareness component can be employed to monitor and detect criteria associated with data transmitted to and requested from the device 1104. In operation, these contextual factors can be used to filter spam, control retrieval (e.g., access to highly sensitive data from a public network), or the like. It will be understood that, in aspects, the contextual awareness component can employ logic that regulates transmission and/or retrieval of data in accordance with external criteria and factors. The contextual awareness employment can be used in connection with an artificial intelligence (AI) layer 1108.

The AI layer or component can be employed to facilitate inferring and/or determining when, where, how to dynamically vary the level of security and/or vary how PDCP information should be sent to the target eNB and for the source eNB and whether the PDCP information is to be sent before or after the UE has completed, the re-pointing procedure. Because there are tradeoffs regarding duplicate or wasted RLC SDUs being sent from the source eNB 1102 to the mobile device 1104 that will ignore them because the mobile device will receive the RLC SDUs from the new target eNB 113, dependent on network resource factors, it may be desirable to determine on the fly as to what information is sent to which eNB. Such inference results in the construction of new events or actions from a set of observed events and/or stored event data, whether or not the events are correlated in close temporal proximity, and whether the events and data come from, one or several event(s) and data source(s).

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to prognose or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

Additionally the sensor 1110 can be employed in conjunction with the security layer 1106. Still further, human authentication factors can be used to enhance security employing sensor 1110. For instance, biometrics (e.g., fingerprints, retinal patterns, facial recognition, DNA sequences, handwriting analysis, voice recognition) can be employed to enhance authentication to control access of a storage vault. It will be understood that embodiments can employ multiple factor tests in authenticating identity of a user.

The sensor 1110 can also be used to provide the security layer 1106 with generalized non-human metric data, such as electromagnetic field condition data or predicted weather data etc. For example, any conceivable condition can be sensed for and security levels can be adjusted or determined in response to the-sensed condition.

Figure 12:
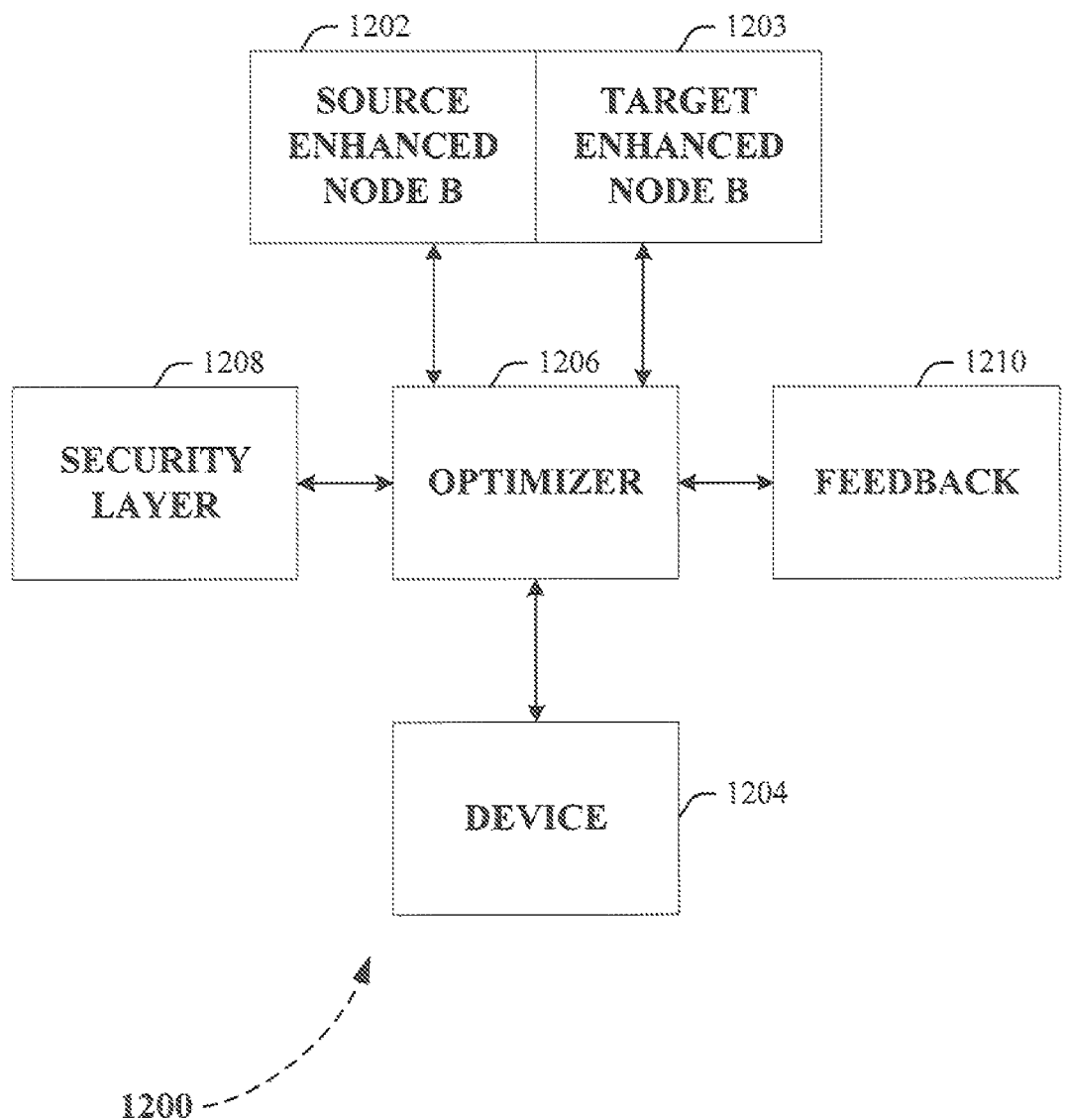
FIG. 12 illustrates an environment 1200 wherein a source enhanced, node B and a target enhanced node B are in communication with a mobile device in accordance with one or more aspects.

FIG. 12 illustrates an environment 1200 wherein a source enhanced node B is at 1202 and a target enhanced node B is at 1203. The source enhanced node B 1202 can be broadcasting a service such as a CNN feed or a MSNBC feed to a mobile device at 1204. Alternatively or in addition to a broadcast service, the mobile device 1204 can be otherwise connected to the source enhanced node B 1202 such as for making a phone call. The mobile device 1204 is in motion and is approaching an area where the target enhanced node B 1203 is closer. In one exemplary generalized non-limiting embodiment, the methodology 1200 includes employing an optimizer at 1206. The optimizer 1206 is provided to optimize communication between the enhanced node Bs and device 1204. Optimizer 1206 optimizes or increases communication between the SFNs and device 1204 by receiving security information from a security layer 1208. For example, when security layer 1208 informs optimizer 1206 that they are both in a secured environment, the optimizer 1206 balances this information with other information and may instruct the security layer 1208 to make all transmissions security free to achieve top speed. Additionally, a feedback layer or component 1210 can provide feedback as to missed data packets or other information to provide feedback to the optimizer 1206.

This feedback of missed packets can be balanced against desired security level to enable less secure but higher throughput data transfer if desired. Additionally optimizer 1206 may include a memory storing historical statistical data and because there are tradeoffs regarding duplicate or wasted RLC SDUs being sent from the source eNB 1202 to the mobile device 1204 that may ignore them because the mobile device will receive the RLC SDUs from the new target eNB 113, dependent on network resource factors, it maybe desirable for optimizer 1206 to determine on the fly as to what information is sent to which eNB.

Figure 13:
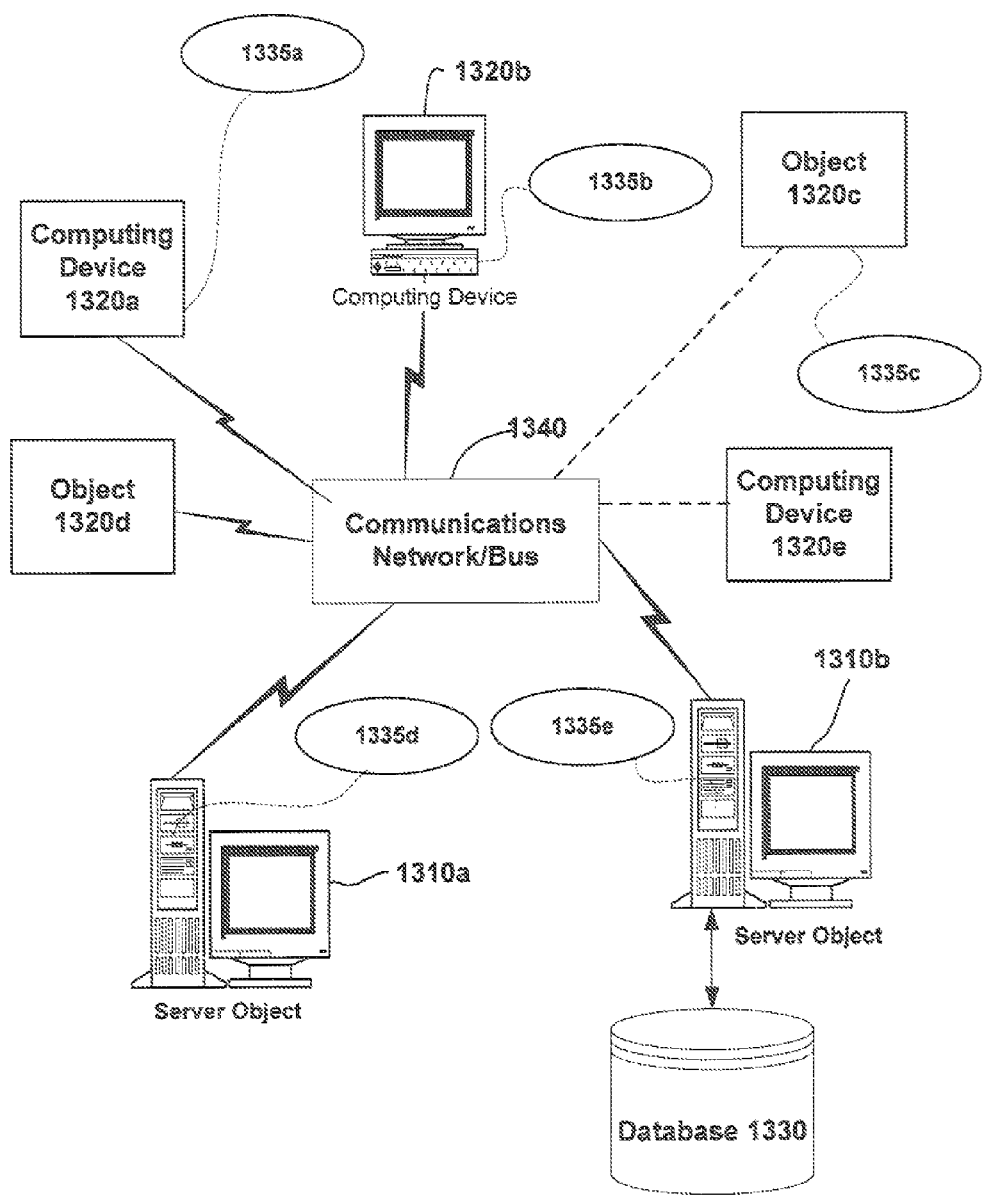
FIG. 13 provides a schematic diagram of an exemplary networked or distributed computing environment in accordance with one or more aspects.

FIG. 13 provides a schematic diagram of an exemplary networked or distributed computing environment. The distributed computing environment comprises computing objects 1310*a*, 1310*b*, etc. and computing objects or devices 1320*a*, 1320*b*, 1320*c*, 1320*d*, 1320*e*, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 1340. This network can itself comprise other computing objects and computing devices that provide services to the system of FIG. 13, and can itself represent multiple interconnected networks. In accordance with an aspect of at least one generalized non-limiting embodiment, each object 1310*a*, 1310*b*, etc. or 1320*a*, 1320*b*, 1320*c*, 1320*d*, 1320*e*, etc. can contain an application that might make use of an application programming interface (API), or other object, software, firmware and/or hardware, suitable for use with the design framework in accordance with at least one generalized non-limiting embodiment.

It can also be appreciated that an object, such as 1320*c*, can be hosted on another computing device 1310*a*, 1310*b*, etc. or 1320*a*, 1320*b*, 1320*c*, 1320*d*, 1320*e*, etc. Thus, although the physical environment depicted can show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to optimization algorithms and processes according to the present innovation.

In home networking environments, there are at least four disparate network transport media that can each support a unique protocol, such as Power line, data(both wireless and wired), voice (e.g., telephone) and entertainment media. Most home control devices such as light switches and appliances can use power lines for connectivity. Data Services can enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. All of these network environments and others that can emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the present innovation can share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network, infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 13, as an example, computers 1320*a*, 1320*b*, 1320*c*, 1320*d*, 1320*e*, etc. can be thought of as clients and computers 1310*a*, 1310*b*, etc. can be thought of as servers where servers 1310*a*, 1310*b*, etc. maintain the data that is then replicated to client computers 1320*a*, 1320*b*, 1320*c*, 1320*d*, 1320*e*, etc., although any computer can be considered a client, a server, or both, depending on the circumstances. Any of these computing devices can be processing data or requesting services or tasks that can implicate the optimization algorithms and processes in accordance with at least one generalized non-limiting embodiment.

A server is typically a remote computer system accessible over a remote or local network, such as the Internet or wireless network infrastructures. The client process can be active in a first computer system, and the server process can be active in a second, computer system, communicating with one another over a communications medium, thus providing distributed functionality and allowing multiple clients to take advantage of the information-gathering capabilities of the server. Any software objects utilized pursuant to the optimization algorithms and processes of at least one generalized non-limiting embodiment can be distributed across multiple computing devices or objects.

Client(s) and server(s) communicate with one another utilizing the functionality provided by protocol layers). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other.

The network address can be referred to as a URL address. Communication can be provided over a communications medium, e.g., client(s) and server(s) can be coupled to one another via TCP/IP connections) for high-capacity communication.

Thus, FIG. 13 illustrates an exemplary networked or distributed environment, with server(s) in communication with client computer (s) via a network/bus, in which the present innovation can be employed. In more detail, a number of servers 1310a, 1310b, etc. are interconnected via a communications network/bus 1340, which can be a LAN, WAN, intranet, GSM network, the Internet, etc., with a number of client or remote computing devices 1320a, 1320b, 1320c, 1320d, 1320e, etc., such as a portable computer, handheld computer, thin client, networked appliance, or other device, such as a VCR, TV, oven, light, heater and the like in accordance with the present innovation. It is thus contemplated that the present innovation can apply to any computing device in connection with which it is desirable to communicate data over a network.

In a network environment in which the communications network/bus 1340 is the Internet, for example, the servers 1310a, 1310b, etc. can be Web servers with which, the clients 1320a, 1320b, 1320c, 1320d, 1320e, etc. communicate via any of a number of known protocols such as HTTP. Servers 1310a, 1310b, etc. can also serve as clients 1320a, 1320b, 1320c, 1320d, 1320e, etc., as can be characteristic of a distributed computing environment.

As mentioned, communications can be wired or wireless, or a combination, where appropriate. Client devices 1320a, 1320b, 1320c, 1320d, 1320e, etc. can or cannot communicate via communications network/bus 14, and can have independent communications associated therewith. For example, in the case of a TV or VCR, there can or cannot be a networked aspect to the control thereof. Each client computer 1320a, 1320b, 1320c, 1320d, 1320e, etc. and server computer 1310a, 1310b, etc. can be equipped with various application program modules or objects 1335a, 1335b, 1335c, etc. and with connections or access to various types of storage elements or objects, across which files or data streams can be stored or to which portion(s) of files or data streams can be downloaded, transmitted or migrated. Any one or more of computers 1310a, 1310b, 1320a, 1320b, 1320c, 1320d, 1320e, etc. can be responsible for the maintenance and updating of a database 1330 or other storage element, such as a database or memory 1330 for storing data processed or saved according to at least one generalized non-limiting embodiment. Thus, the present innovation can be utilized in a computer network, environment having client computers 1320a, 1320b, 1320c, 1320d, 1320e, etc. that can access and interact with a computer network/bus 1340 and server computers 1310a, 1310b, etc. that can interact with client computers 1320a, 1320b, 1320c, 1320d, 1320e, etc. and other like devices, and databases 1330.

Exemplary Computing Device

As mentioned, the innovation applies to any device wherein it can be desirable to communicate data, e.g., to a mobile device. It should be understood, therefore, that handheld, portable and other computing devices and computing objects of all kinds are contemplated for use in connection with the present innovation, i.e., anywhere that a device can communicate data or otherwise receive, process or store data. Accordingly, the below general purpose remote computer described below in FIG. 11 is but one example, and the present innovation can be implemented with any client having network/bus interoperability and interaction. Thus, the present innovation can be implemented in an environment of networked hosted services in which very little or minimal client resources are implicated, e.g., a networked environment in which the client device serves merely as an interface to the network/bus, such as an object placed in an appliance.

Although not required, at least one generalized non-limiting embodiment can partly be implemented via an operating system, for use by a developer of services for a device or object, and/or included within application software that operates in connection with the component(s) of at least one generalized non-limiting embodiment. Software can be described in the general context of computer executable instructions, such as program modules, being executed by one or more computers, such as client workstations, servers, or other devices. Those skilled in the art will appreciate that the innovation can be practiced with other computer system configurations and protocols.

Figure 14:
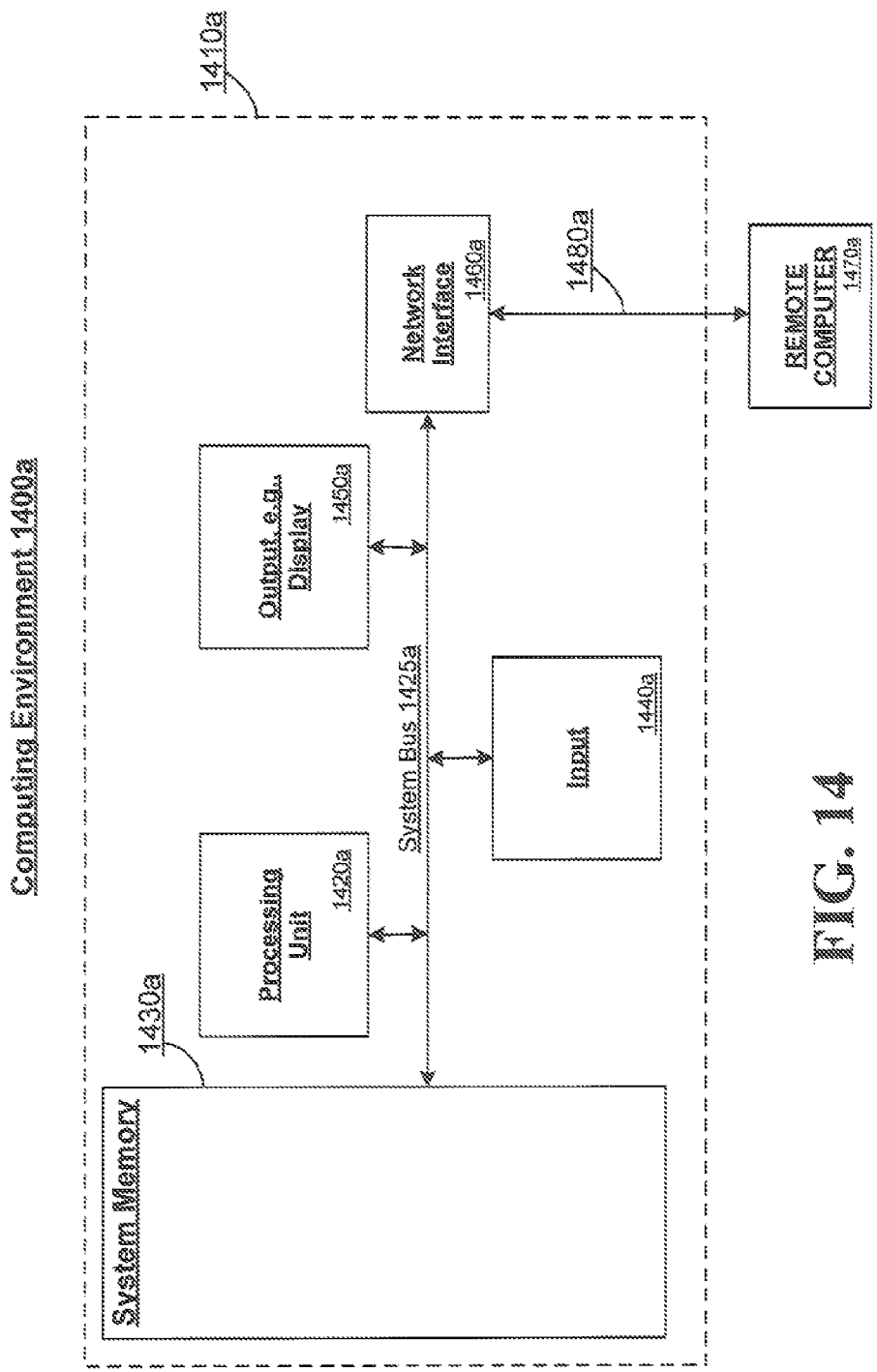
FIG. 14 illustrates an example of a suitable computing system environment in accordance with one or more aspects.

FIG. 14 thus illustrates an example of a suitable computing system environment 1400a in which, the innovation can be implemented, although as made clear above, the computing system environment 1400a is only one example of a suitable computing environment for a media device and is not intended to suggest any limitation as to the scope of use or functionality of the innovation. Neither should the computing environment 1400a be interpreted as having any dependency or requirement relating to any one of combination of components illustrated in the exemplary operating environment 1400a.

With reference to FIG. 14, an exemplary remote device for implementing at least one generalized non-limiting embodiment includes a general purpose computing device in the form of a computer 1410a. Components of computer 1410a can include, but are not limited to, a processing unit 1420a, a system memory 1430a, and a system bus 1425a that couples various system components including the system memory to the processing unit 1420a. The system bus 1425a can be any of several types of bus structures including a memory bus or memory controller, a peripheral bus, and a local bus using any of a variety of bus architectures.

Computer 1410a typically includes a variety of computer readable media. By way of example, computer-readable media can comprise tangible computer storage media and the like. Computer storage media includes volatile and non-volatile, removable and non-removable media implemented in any method or technology for storage of information such as computer readable instructions, data structures, program modules, or other data. Computer storage media includes RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by computer 1410a. Communication media typically embodies computer readable instructions, data structures, program modules, or other data in a modulated data signal such as a carrier wave or other transport mechanism and includes any information delivery media.

The system memory 1430a can include computer storage media in the form of volatile and/or non-volatile memory such as read only memory (ROM) and/or random access memory (RAM). A basic input/output system (BIOS), containing the basic routines that help to transfer information between elements within computer 1410a, such as during start-up, can be stored in memory 1430a. Memory 1430a typically also contains data and/or program modules that are immediately accessible to and/or presently being operated on by processing unit 1420a. By way of example, and not limitation, memory 1430a can also include an operating system, application programs, other program modules, and program data.

The computer 1410a can also include other removable/non-removable, volatile/non-volatile computer storage media. For example, computer 1410a could include a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1425a through a non-removable memory interface such as an interface, and a magnetic disk drive or optical disk drive is typically connected to the system bus 1425a by a removable memory interface, such as an interface.

A user can enter commands and information into the computer 1410a through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1420a through user input 1440a and associated interface(s) that are coupled to the system bus 1425a, but can be connected by other interface and bus structures, such as a parallel port, game port or a universal serial bus (USB). A graphics subsystem can also be connected to the system bus 1425a. A monitor or other type of display device is also connected to the system bus 1425a via an interface, such as output interface 1450a, which can in turn communicate with video memory. In addition to a monitor, computers can also include other peripheral output devices such as speakers and a printer, which can be connected through output interface 1450a.

The computer 1410a can operate in a networked or distributed environment using logical connections to one or more other remote computers, such as remote computer 1470a, which can in turn have media capabilities different from device 1410a. The remote computer 1470a can be a personal computer, a server, a router, a network PC, a peer device or other common network node, or any other remote media consumption or transmission device, and can include any or all of the elements described above relative to the computer 1410a. The logical connections depicted in FIG. 14 include a network 1480a, such local area network (LAN) or a wide area network (WAN), but can also include other networks/buses. Such networking environments are commonplace in homes, offices, enterprise-wide computer networks, intranets, and the Internet.

When used in a LAN networking environment, the computer 1410a is connected to the LAN 1480a through a network interface or adapter. When used in a WAN networking environment, the computer 1410a typically includes a communications component, such as a modem, or other means for establishing communications over the WAN, such as the Internet. A communications component, such as a modem, which can be internal or external, can be connected to the system bus 1425a via the user input interface of input 1440a, or other appropriate mechanism. In a networked environment, program modules depicted relative to the computer 1410a, or portions thereof, can be stored in a remote memory storage device. It will be appreciated that the network connections shown and described are exemplary and other means of establishing a communications link between the computers can be used.

Figure 15:
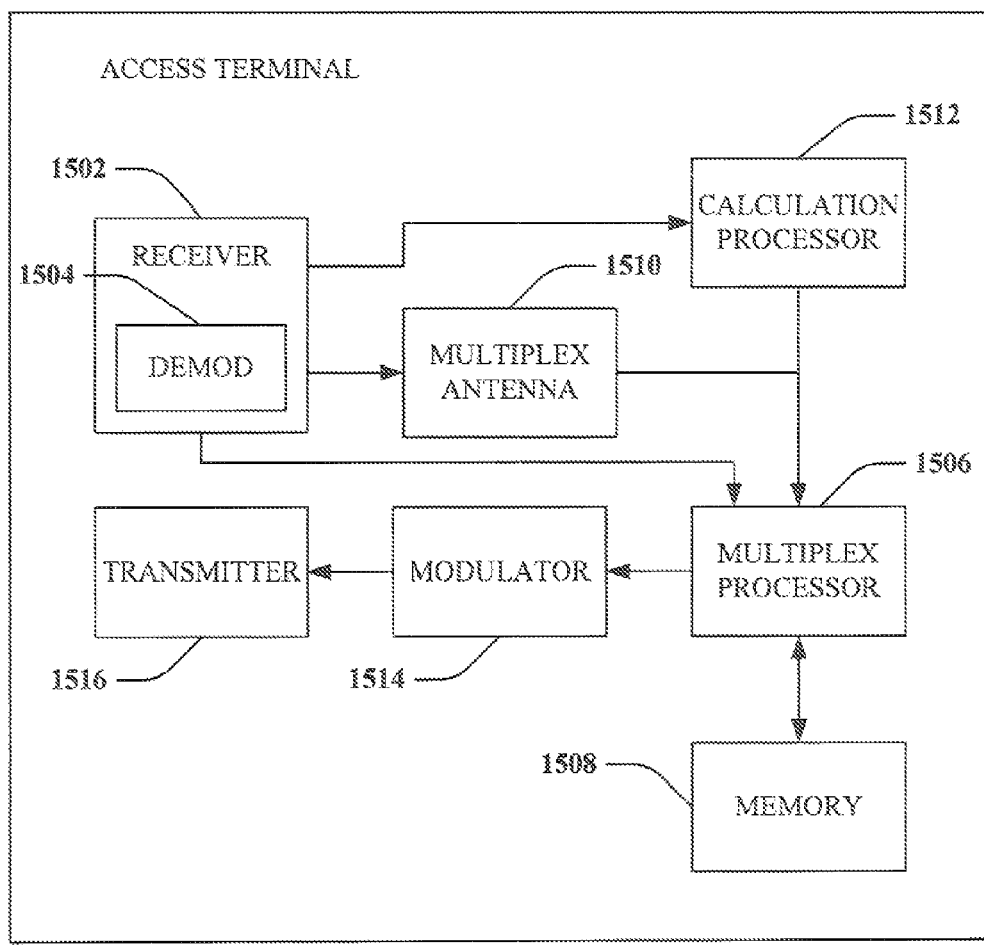
FIG. 15 depicts an exemplary access terminal that can provide feedback to communications networks, in accordance with one or more aspects.

FIG. 15 depicts an exemplary access terminal 1500 that can provide feedback to communications networks, in accordance with one or more aspects. Access terminal 1500 comprises a receiver 1502 (e.g., an antenna) that receives a signal and performs typical actions on (e.g., filters, amplifies, down converts, etc.) the received signal. Specifically, receiver 1502 can also receive a service schedule defining services apportioned to one or more blocks of a transmission allocation period, a schedule correlating a block of downlink resources with a block of uplink resources for providing feedback information as described herein, or the like. Receiver 1502 can comprise a demodulator 1504 that can demodulate received symbols and provide them to a processor 1506 for evaluation. Processor 1506 can be a processor dedicated to analyzing information received by receiver 1502 and/or generating information for transmission by a transmitter 1516. Additionally, processor 1506 can be a processor that controls one or more components of access terminal 1500, and/or a processor that analyzes information received by receiver 1502, generates information for transmission by transmitter 1516, and controls one or more components of access terminal 1500. Additionally, processor 1506 can execute instructions for interpreting a correlation of uplink and downlink resources received by receiver 1562, identifying un-received downlink block, or generating a feedback message, such as a bitmap, appropriate to signal such up-received block or blocks, or for analyzing a hash function to determine an appropriate uplink resource of a plurality of uplink resources, as described herein.

Access terminal 1500 can additionally comprise memory 1508 that is operatively coupled to processor 1506 and that may store data to be transmitted, received, and the like. Memory 1508 can store information related to downlink resource scheduling, protocols for evaluating the foregoing, protocols for identifying un-received portions of a transmission, for determining an indecipherable transmission, for transmitting a feedback message to an access point, and the like.

It will be appreciated that the data store (e.g., memory 1508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1508 of the subject systems and methods is intended to comprise, without being limited to, these and any other suitable types of memory.

Receiver 1502 is further operatively coupled to multiplex antenna 1510 that can receive a scheduled correlation between one or more additional blocks of downlink transmission resources and a block of uplink transmission resources. A multiplex processor 1506 can include a multi-digit. Further, a calculation processor 1512 can receive a feedback probability function, wherein the function limits a probability that a feedback message is provided by access terminal 1500, as described herein, if the block of downlink transmission resources, or data associated therewith, is not received.

Access terminal 1500 still further comprises a modulator 1514 and a transmitter 1516 that transmits the signal to, for instance, a base station, an access point, another access terminal, a remote agent, etc. Although depicted as being separate from the processor 1506, it is to be appreciated that signal generator 1510 and indicator evaluator 1512 may be part of processor 1506 or a number of processors (not shown).

Figure 16:
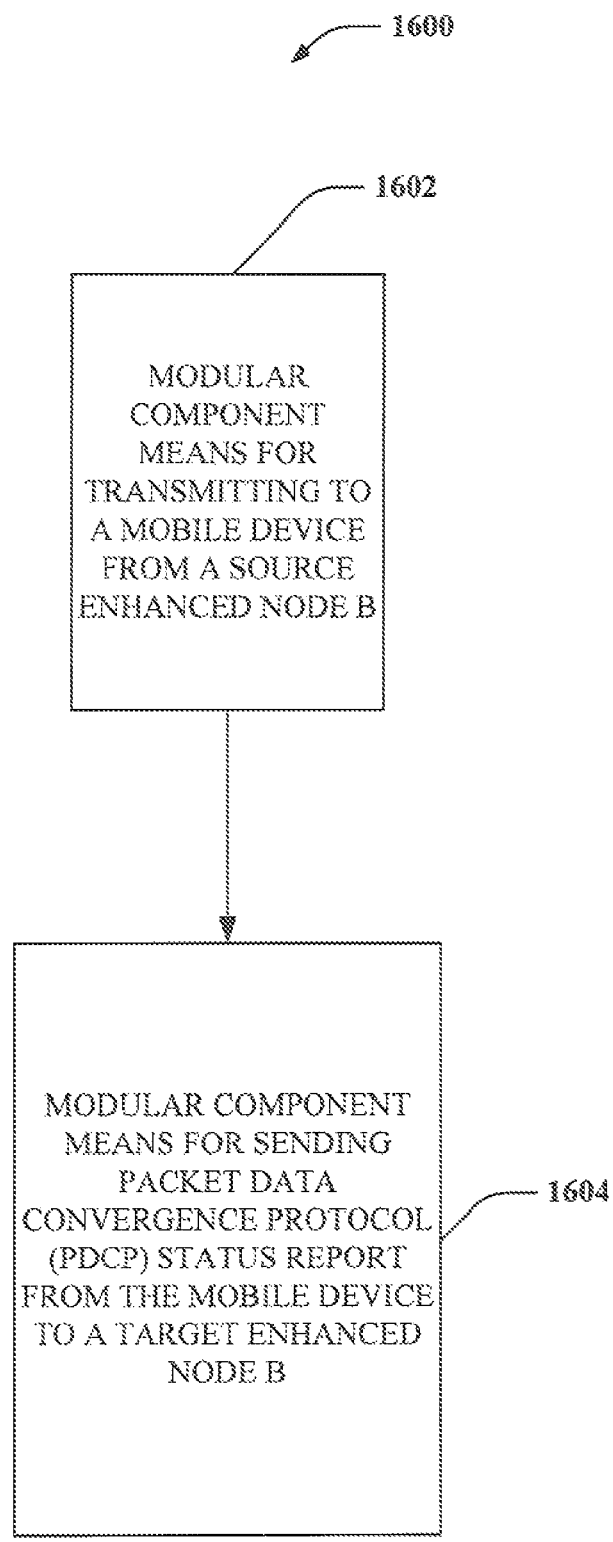
FIG. 16 illustrates an apparatus operable in a wireless communication system.

FIG. 16 illustrates an apparatus 1600 operable in a wireless communication system including a plurality of cells, the apparatus includes modular component means 1602 for transmitting to a mobile device from a source enhanced node B and modular component means 1604 for sending Packet Data Convergence Protocol (PDCP) status report from the mobile device to a target enhanced node B.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communication system including a plurality of cells, the method comprising:
   receiving transmissions at a mobile device from a source enhanced node B;
   sending a Packet Data Convergence Protocol (PDCP) status report through a PDCP layer to a target enhanced node B on a radio link from the mobile device to the target enhanced node B prior to completion of a handover operation from the source enhanced node B to the target enhanced node B; and
   resetting Radio Link Control (RLC) PDU numbering associated with the source enhanced node B link in connection with the handover operation, wherein the PDCP status report comprises PDCP sequence numbers added to RLC layer SDUs by the PDCP layer, the PDCP sequence numbers being common to both the source enhanced node B and the target enhanced node B and distinct from RLC PDU numbering associated with a source enhanced node B link, which RLC PDU numbering associated with the source enhanced node B link is not relevant to communication with the target enhanced node B.

2. A method in accordance with claim 1 wherein the sending comprises sending information relevant to both to the target enhanced node B and the source enhanced node B.

3. A method in accordance with claim 2 further comprising sending PDCP information comprising sending at least one PDCP sequence number to the target enhanced node B from the mobile device.

4. A method in accordance with claim 1 further comprising sending PDCP information comprising sending at least one PDCP sequence number to the target enhanced node B from the mobile device.

5. A method in accordance with claim 1 further comprising sending a handoff confirm message to the target enhanced node B.

6. The method of claim 1, further comprising:
   receiving handed over transmissions from the target enhanced node B after completion of the handover operation, wherein the handed over transmissions are selected by the target enhanced node B based on the PDCP status report.

7. The method of claim 6, wherein the handed over transmissions comprise only RLU SDUs missing from transmissions by the source enhanced node B.

8. An apparatus operable in a wireless communication system, the apparatus comprising:
   a mobile device processor configured to receive transmissions from a source enhanced node B and send a Packet Data Convergence Protocol (PDCP) status report to a target enhanced node B on a radio link through a PDCP layer prior to completion of a handover operation from the source enhanced node B to the target enhanced node B,
   wherein the PDCP status report comprises PDCP sequence numbers added to Radio Link Control (RLC) layer SDUs by the PDCP layer, the PDCP sequence numbers being common to both the source enhanced node B and the target enhanced node B and distinct from RLC PDU numbering associated with a source enhanced node B link, which RLC PDU numbering associated with the source enhanced node B link is reset in connection with the handover operation and is not relevant to communication with the target enhanced node B; and
   a memory coupled to the processor for storing data.

9. An apparatus in accordance with claim 8 wherein the processor is configured to send information relevant to both to the target enhanced node B and the source enhanced node B.

10. An apparatus in accordance with claim 9 wherein the processor is configured to send a handoff confirm message.

11. An apparatus in accordance with claim 8 wherein the processor is configured to send a handoff confirm message.

12. The apparatus of claim 8, further comprising:
    means for receiving handed over transmissions from the target enhanced node B after completion of the handover operation, wherein the handed over transmissions are selected by the target enhanced node B based on the PDCP status report.

13. The apparatus of claim 12, wherein the handed over transmissions comprise only RLU SDUs missing from transmissions by the source enhanced node B.

14. An apparatus operable in a wireless communication system including a plurality of cells, the apparatus comprising:
    means for receiving transmissions at the apparatus from a source enhanced node B;
    means for sending Packet Data Convergence Protocol (PDCP) status report from the apparatus to a target enhanced node B on a radio link through a PDCP layer prior to completion of a handover operation from the source enhanced node B to the target enhanced node B; and
    means for resetting Radio Link Control (RLC) PDU numbering associated with the source enhanced node B link in connection with the handover operation, wherein the PDCP status report comprises PDCP sequence numbers added to RLC layer SDUs by the PDCP layer, the PDCP sequence numbers being common to both the source enhanced node B and the target enhanced node B and distinct from RLC PDU numbering associated with a source enhanced node B link, which RLC PDU numbering associated with the source enhanced node B link is not relevant to communication with the target enhanced node B.

* * * * *